Oct. 19, 1965        JUAN DE LA CIERVA        3,212,420
IMAGE MOTION COMPENSATOR

Filed Nov. 23, 1962        4 Sheets-Sheet 1

INVENTOR.
JUAN De La CIERVA
BY
ATTORNEYS

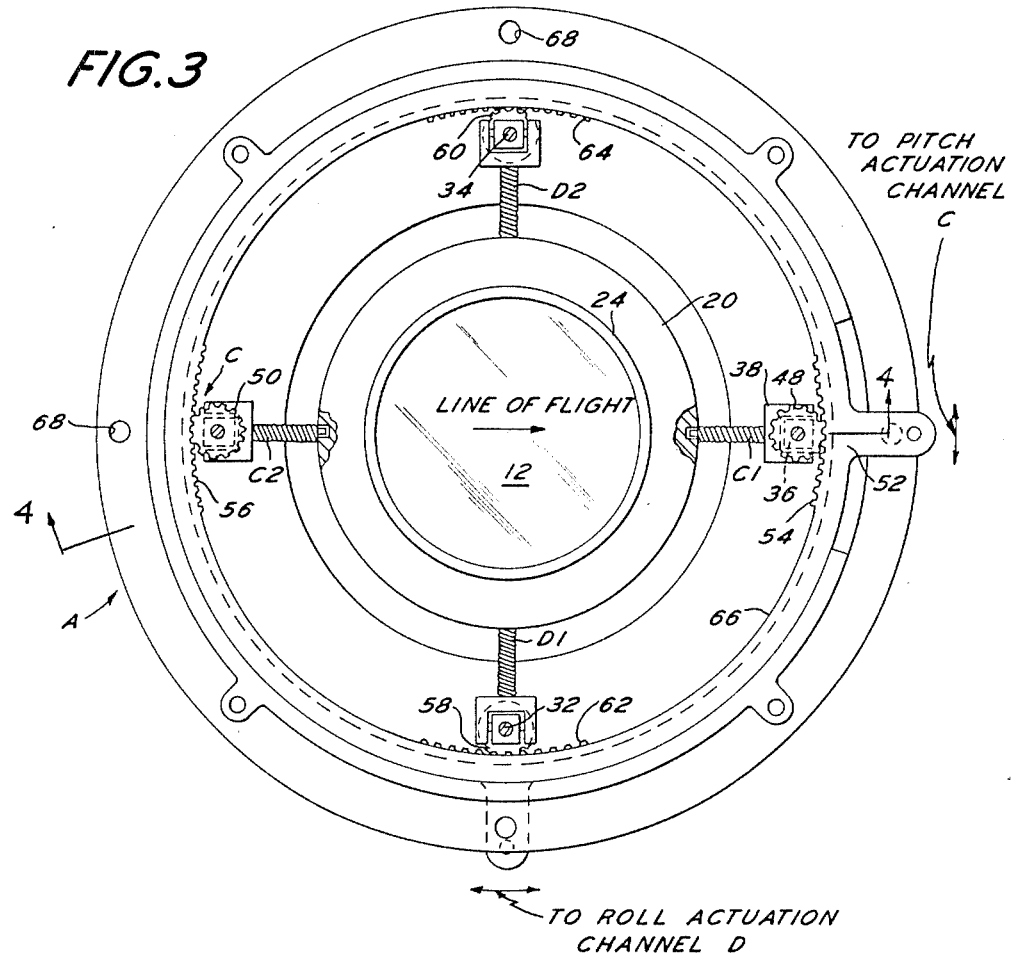
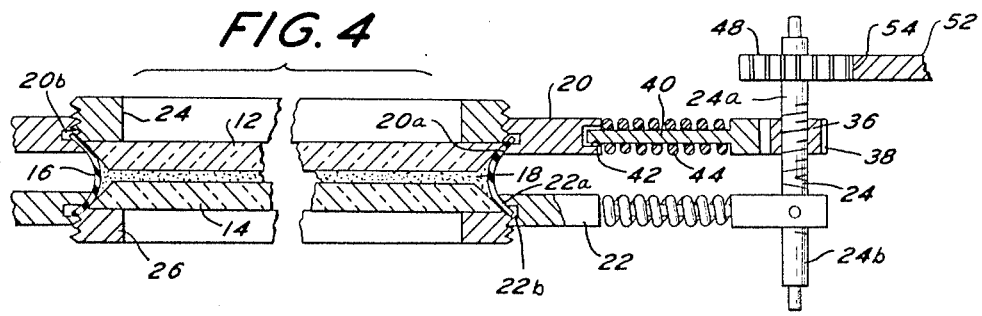

Oct. 19, 1965    JUAN DE LA CIERVA    3,212,420
IMAGE MOTION COMPENSATOR
Filed Nov. 23, 1962    4 Sheets-Sheet 4

INVENTOR.
JUAN De La CIERVA
BY
ATTORNEYS

UNITED STATES PATENT OFFICE 3,212,420
Patented Oct. 19, 1965

3,212,420
IMAGE MOTION COMPENSATOR
Juan De La Cierva, Philadelphia, Pa., assignor to Dynasciences Corporation, Fort Washington, Pa., a corporation of Pennsylvania
Filed Nov. 23, 1962, Ser. No. 239,533
20 Claims. (Cl. 95—12.5)

This invention relates to an image motion compensating device for aeronautical and astronautical optical systems especially in connection with aerial, satellite and space vehicle photography, navigation or reconnaissance.

Aerial and space reconnaissance specifically requires a highly refined form of photography which is capable of producing undistorted, precision-quality images with optimum resolution characteristics and minimum scale or deviational error. To obtain this fine photographic quality, it is necessary to minimize any relative motion between the camera and the object under observation during the exposure time since such motion produces image displacement at the focal plane with corresponding degradation in image resolution quality. Camera motions which normally lead to deterioration in photographic image quality include not only the ordinary longitudinal flight velocity of the aircraft and its inherent vibrations with respect to the object being photographed, but also vehicular angular motions such as roll, pitch and yaw.

Heretofore, aerial and space cameras have been equipped with mechanical film advancing arrangements for continuously feeding the film during exposure time in a direction corresponding to the aircraft line of flight at a speed related to the ground speed and altitude of the vehicle. However, driving or displacing such film at a continuous speed would only offset the forward motion of the vehicle, and would not compensate for the roll, pitch and yaw angular motions which sometimes produce image aberrations exceeding the values resulting from vehicular forward motion.

Previous endeavors to neutralize the angular motions of the aircraft in the roll, pitch and yaw directions have been primarily directed to gyroscopically-controlled, stabilized camera platforms which were actuated in response to feed-information systems continuously monitoring in-flight data. Necessarily associated with the camera platform were a series of complex gimbal mounts about which compensating rotation was effected to offset the irregular flight angular disturbances. However, since the stabilized platform must be vibratioin isolated as well by the use of resilient or flexible mounts, it is readily seen that the dynamic response of such platforms was seriously limited because of the large mass of the camera and the associated components. Thus, it was necessary to design relatively heavy driving systems for instantaneously shifting the camera mount in order to correct for the light path deviation resulting from angular motion. This produced not only increased weight and power requirements but also resulted in the addition of appreciable expense to the system.

Similarly, hitherto employed optical systems for compensating for the roll, pitch and crabbing motions of an airplane in flight incorporated extremely expensive and complicated mirror, prismatic and lens constructions. In addition to the extremely sensitive balancing and adjusting systems required for the earlier optical motion compensators, their application required placement in front of the camera objective lens and consequently interfered with the wide angle of view desired. Furthermore, positioning the prior optical systems between the objective and the focal plane not only intruded upon the camera field and increased camera size, but also lessened light efficiency as a necessary concomitant to the increase in number of reflective and refractive optical elements.

It is therefore an object of this invention to provide an improved image motion compensator for aerial and space vehicles.

Another object of this invention is to provide an image motion compensating device for aerial and space cameras which will instaneously neutralize before entering the camera all angular and rectilinear image displacement resulting from motion of the aircraft or space vehicle during flight.

Another object of this invention is to provide a simplified optical system for image motion compensation which is easily adapted for use on all currently employed aerial cameras and which will not intrude in any way upon the field of view nor detract from illumination and light efficiency nor affect camera size or focal length.

Still another object of this invention is to provide an image motion compensator having minimum mass and inertia and whose dynamic response in all degrees of freedom is substantially instantaneous and linear.

Yet another object of this invention is to provide an aerial and space photographic control system for precisely nullifying image motion continuously so as to maintain camera resolution characteristics at optimum.

A further object of this invention is to provide an improved means for aeronautical and astronautical navigational and star tracking devices which will compensate for aircraft and space vehicle motion as well as that of the star reference.

A further object of this invention is to provide means for stabilizing the virtual image formed by a binocular or telescope when the operator thereof is situated in a vibratory environment, such as an aircraft, ground vehicle or other.

Other objects of this invention are to provide an improved device of the character described that is easily and economically produced, which is sturdy in construction, and which is highly efficient and effective in operation.

With the above and related objects in view, this invention consists of the details of construction and combination of parts as will be more fully understood from the following detailed description when read in conjunction with the accompanying drawing in which:

FIGURE 3 is a sectional view taken along lines 3—3 of FIGURE 2.

FIGURE 4 is an enlarged sectional view taken along lines 4—4 of FIGURE 3.

FIGURE 8 is a block diagram illustrating the use of the image motion compensator in an astronautical tracking system.

Figure 1:
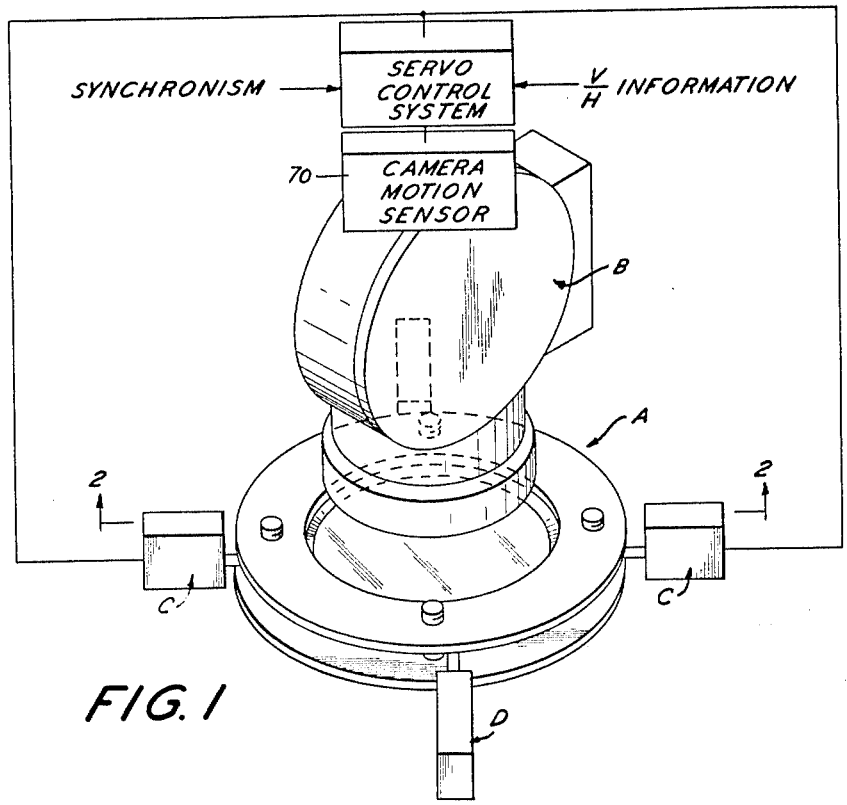
FIGURE 1 is a perspective view, and partly schematic, of an image motion compensator embodying this invention.

Referring now in greater detail to the drawings in which similar reference characters refer to similar parts, in essence, the image motion compensator of the instant invention comprises a variable angle fluid-filled prismatic wedge, generally designated as A, which is mounted immediately forward of the objective lens of a standard aerial camera photographic optical system, generally designated as B.

The angle of the prism A, as well as the azimuth of its arris, is controlled by a servo system into which is fed flight data information so that the optical path of the image is bent by the wedge a prescribed amount in the correct azimuth. The amount, direction and rate of camera tilt is monitored by appropriate sensors located in the camera body, and serves as the input signal to the servo system which actuates the orientation of the fluid-filled wedge A. The sensing, as well as the prism actuation is performed simultaneously and instantaneously about the pitch and roll axes of the vehicle. Information regarding the ratio of forward speed to altitude is also fed into the control system in order to compensate for the vehicle's forward motion. The signal analog of this velocity or ground speed to altitude ratio (v./h.) is continuously added to the pitch direction component of the angular motion detector to provide forward motion compensation. Hence, no mechanical film advancement is necessary. See FIGURE 7.

It has been found that the image aberrations produced by yaw or crabbing motions of the vehicle are negligible, and therefore, it is not necessary to correct for this motion in the image compensator. That is, since the yaw motion is about the optical axis of the camera, the magnification of this component is insignificant as compared to the roll and pitch deviations and accordingly little, of no resolution degradation is encountered.

Figure 2:
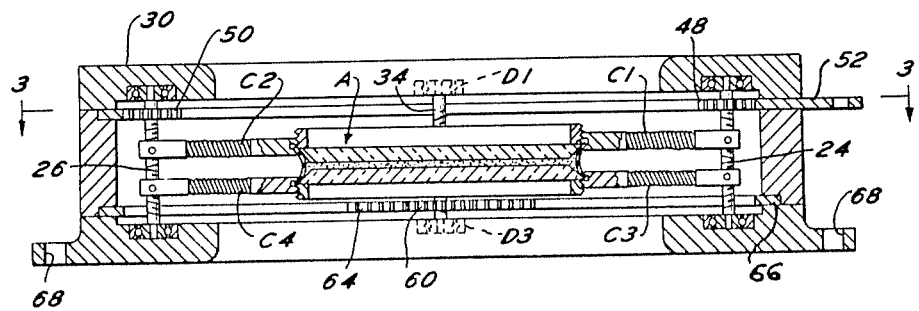
FIGURE 2 is a sectional view taken along lines 2—2 of FIGURE 1.

Referring to FIGURES 2 and 4, the prismatic wedge A comprises a pair of transparent plates or disks 12 and 14 which are spaced from each other and held peripherally by a flexible, toroidal-shaped seal 16. The space 18 intermediate the disks is filled with a fluid having a suitable coefficient of thermal expansion and a generally constant index of refraction with temperature over the range between —65° F. and 140° F. Liquids which appear to be satisfactory for this purpose may include benzene, bromine, ethyl alcohol, ethylether, glycerol, phenol and combination thereof, although these are intended as being merely illustrative rather than limiting. It is also to be understood that while the transparent disks 12 and 14 as illustrated are shown to have substantially plane and parallel faces, applications contemplated for the instant invention in certain instances may include nonparallel faces or spherical aand aspherical surfaces and combinations of these as well. In addition, the disks may be of glass, or other optically transparent material, and for certain purposes may utilize more than two plates or may include sets of axially-stacked pairs in optical alignment.

Figure 6:
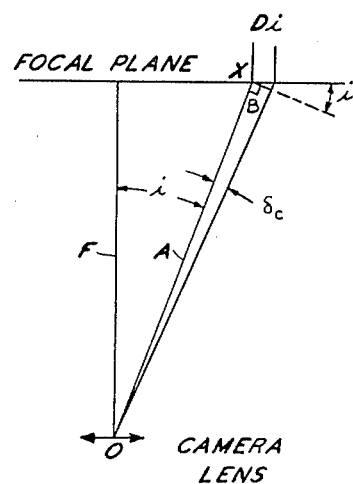
FIGURE 6 is a diagram indicating geometrically the deviation produced in the camera optical system by angular displacement thereof.

As is demonstrated herein, the relative angular position of the glass plates 12 and 14 is determined by the desired degree of correction which is to be made for deviation or deflections of light rays at the focal plane of the camera B which result from angular motion thereof. Referring now to FIGURE 6, there is shown two-dimensionally a deviated ray of light produced by camera motion during the time the shutter is open so as to effect a displacement at the focal plane. Considering the ray OX to strike the focal plane at a point of abcissa X at an angle of incidence $i$, and that the change of incidence angle during the time of exposure has a value $\delta_c$, the image displacement, $D_i$, during the exposure can be equated:

$$F = A \cos i \quad (I)$$
$$B = A \tan \delta_c \quad (II)$$
$$B = D_i \cos i \quad (III)$$

so that $$D_i = \frac{B}{\cos i} = \frac{A \tan \delta_c}{\cos i} = \frac{F \tan \delta_c}{\cos^2 i} \quad (IV)$$

and the resolution ($R_x$) of the image at the point X can be calculated as follows:

$$R_x = \frac{1}{2 D_x} = \frac{\cos^2 i}{2 F \tan \delta_c} \quad (V)$$

Where $F$=the camera focal length; $\delta_c$=change in the angle of incidence of any particular ray during the exposure time (due to angular motion of camera); $D_i$=image displacement during exposure time.

Figure 5:
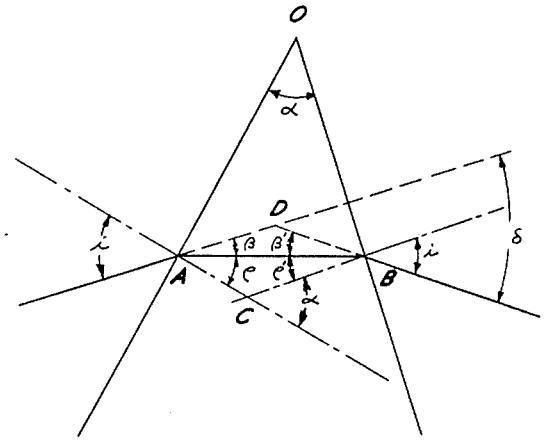
FIGURE 5 is a diagram indicating geometrically the computation of compensating prism angle for a given angular deviation.

Referring now to FIGURE 5, since the disks 12 and 14 have parallel faces, they in themselves do not introduce any angular deviation to infinitely arriving light beams regardless of the ray incidence angle. However, the fluid wedge does introduce a deviation to a ray passing there through. From Snell's law, using the symbols shown in FIGURE 5, $$\sin i = \mu \sin \rho \quad (VI)$$
$$\sin i' = \mu \sin \rho' \quad (VII)$$

By inspection of the triangle ABC, since the angle between normals is geometrically equal to the prism angle $\alpha$, $$\alpha = \rho + \rho' \quad (VIII)$$

and in triangle ABD, $$\delta = \beta + \beta' = (i - \rho) + (i - \rho') = i + i' - \alpha$$

which by substitution gives the deviation produced by the prism as a function of the incoming ray, the prism angle $\alpha$, and the index of refraction $\mu$ of the prism fluid, so that $$\delta = i - \alpha + \sin^{-1}\left\{\mu \sin\left[\alpha - \sin^{-1}\left(\frac{\sin i}{\mu}\right)\right]\right\} \quad (IX)$$

Figure 9:
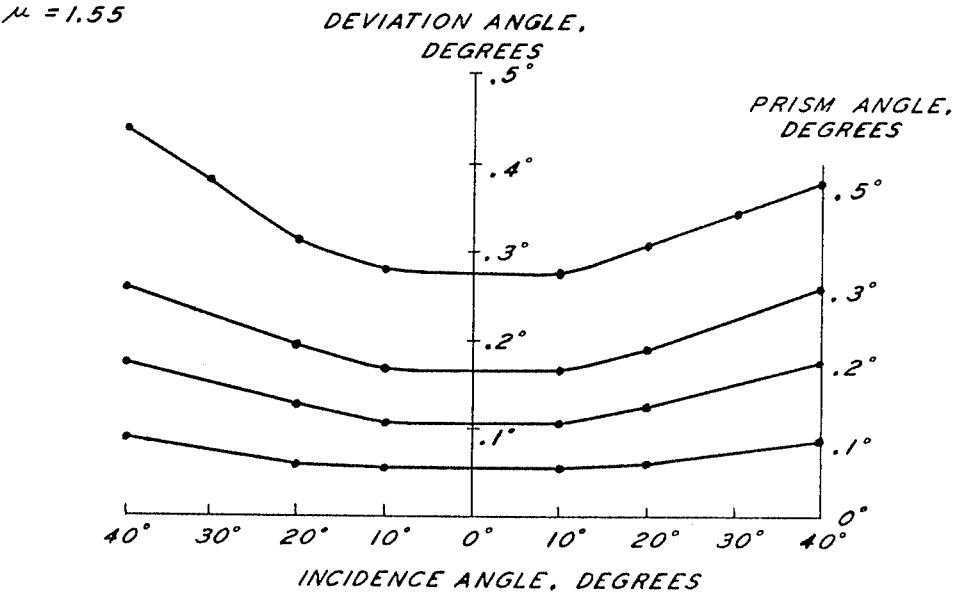
FIGURE 9 is a graph which shows a plot of the deviation angle versus angle of incidence of incoming rays for several prism angles, zero to 0.5 degree.

Plotting the angular deviation ($\delta$) produced by the prism angle ($\alpha$) for an index of refraction ($\mu=1.55$) versus beam incidence angle ($i=\pm 40°$) indicates that the prism angle will always be less than 0.5 degree. See FIGURE 9.

It can be shown that the change of light path length due to variation in thickness of the prismatic fluid along the wedge angle is negligible for a maximum anticipated variation of .08 inch in the wedge with a photographic camera having a focal length of 3 inches, the minimum anticipated for aerial or spaced reconnaissance work. Similarly, the small thickness of the fluid deviating element would reduce the chromatic dispersion levels due to change of index of refraction with light color to insignificant magnitudes.

Referring back to FIGURES 2, 3 and 4, the relative angular position of the transparent plates 12 and 14 is controlled by two sets of actuators, each set providing a linear, push-pull action so that when one actuator of a set expands the other corresponding actuator in that set contracts. The set of pitch actuators C are positioned along an axis parallel to the longitudinal axis of the vehicle (i.e. the ordinary line of flight) and compensate for pitch image motion as well as for forward motion of the vehicle. The roll actuators D are oriented along an axis transverse to the line of flight and produce roll compensating image motion. Simultaneous operation of the pitch and roll actuators produce a motion of the glass disks 12 and 14 concurrently about two axes so that the arris of the fluid wedge may be oriented at an angle to both axes, and the prismatic angle and the arris azimuth will be a function of both pitch and roll actuator deflections.

Referring to FIGURE 4, each of the disks 12 and 14 have peripheral bevels which are complementary to chamfered shoulders 20a and 22a corresponding in flange cells 20 and 22. Clamping rings 24 and 26 threadedly engage internally threaded openings in the respective cells 20 and 22 and bear against the base of the disks so that they resiliently seat upon the chamfered shoulders 20a and 22a with the toroidal seal 16 therebetween. Interior grooves 20b and 22b lend facility to assembly and permit the fluid to be hermetically encapsulated by the toroidal seal 16.

The pitch motion compensation for disk element 12 is oriented by actuating arms C1 and C2 while roll compensation is afforded by actuation arms D1 and D2. Similarly, pitch compensation for disk element 14 is provided by arms C3 and C4 whereas roll motion is compensated by actuation of moment arms D3 and D4. By inspection of FIGURES 2 and 3 it is apparent that the angular positioning of the disk elements 12 and 14 with respect to one another is accomplished by the simultaneous angular displacement of moment arms C1, C2, C3 and C4 for correcting pitch motion and of actuating arms D1, D2, D3 and D4 for correcting roll motion. Radially spaced from the disk cells 20 and 22 are a pair of vertical screws 24 and 26 which are journaled within a peripheral housing 30. Roll compensation screws 32 and 34 are likewise journaled in the housing frame 30 and are disposed diametrically along an axis normal to the pitch actuating screws. Each of the screws has upper and lower thread elements which are opposed to each other so that the upper thread element of each screw will be reversed to that of the lower portion of the same screw and also opposed that of the upper portion of its diametrically positioned complementary screw.

Since each of the actuating arms is mounted and constructed identically, a description of the arm C1, as shown in FIGURE 4, will serve to describe all. The arm C1 comprises an internally-threaded block 36 which is carried upon the upper worm of screw element 24. Pivotally supported along a horizontal axis of the block 36 is a yoke 38 having a rod 40 extending therefrom which freely extends into a radial blind bore 42 in the circumferential wall of the cell 20. The rod 40 acts as an axial support for coil spring member 44 which is compressed between the prism cell 20 and the base of the yoke 38 so as to flexibly retain the cell in central position between opposing actuating arms. The blind bore 42 has a length which is much greater than its internal diameter, and the clearance between the rod and the bore is sufficiently small so as to prevent undesirable play. Again, it is to be noted that the construction and manner of assembly of each of the arms C2, C3, and C4, and D1, D3 and D4 is identical to that of C1 whereby each of the cells 20 and 22 is resiliently supported in a plane at four quadrants. The pivotal supporting of the block 36 within the yoke 38 together with the freedom of movement of the various rods 40 within their complementary bores provides a resilient symmetrical suspension which secures a substantially frictionless movement and vibration isolation of the prism mount.

The worm drive screws 24 and 26 have respective spur gears 48 and 50 secured at the upper portions thereof so that the screws are rotatable therewith. A pitch lever ring 52 concentrically rotatable in the housing 30 has planetary gear segments 54 and 56 diametrically positioned thereon which are in intermeshing engagement with the respective spur gears 48 and 50. Similarly, the roll drive screws 32 and 34 have spur gears 58 and 60 fixed upon their lower ends which engage planetary gear segments 62 and 64 mounted upon roll lever ring 66. Thus rotational motion fed into the pitch and roll drive rings 52 and 66 will impart coresponding angular positioning of the transparent plates 12 and 14 and cause a fluid wedge to be defined between the plates of the appropriate degree and azimuth. The housing 30 is mounted to the vehicle frame by suitable peripheral mounting bosses 68.

It is readily seen that the angular motions of the camera B must be monitored and sensed with high degree of accuracy, these motions essentially being the pitch and roll of the vehicle about its transverse and longitudinal axes. The maximum anticipated rate of angular motion or tilt of the vehicle is in the order of 25 degrees per second or equivalently, a sinusoidal frequency of 1/14 cycles per second. These motions can be detected efficiently by a vertical rate gyroscope 70 since its frequency response is excellent at such relatively low angular frequency rates. The vertical rate gyroscope 70 is conveniently mounted upon or within the camera B as shown in FIGURE 1 in a manner well known in the art. For this purpose, a rate gyroscope such as is shown in U.S. Patent No. 2,851,866 or as is described in Lear, Incorporated Engineering Publication, No. GR-1313, April 1959, would be quite satisfactory.

Figure 7:
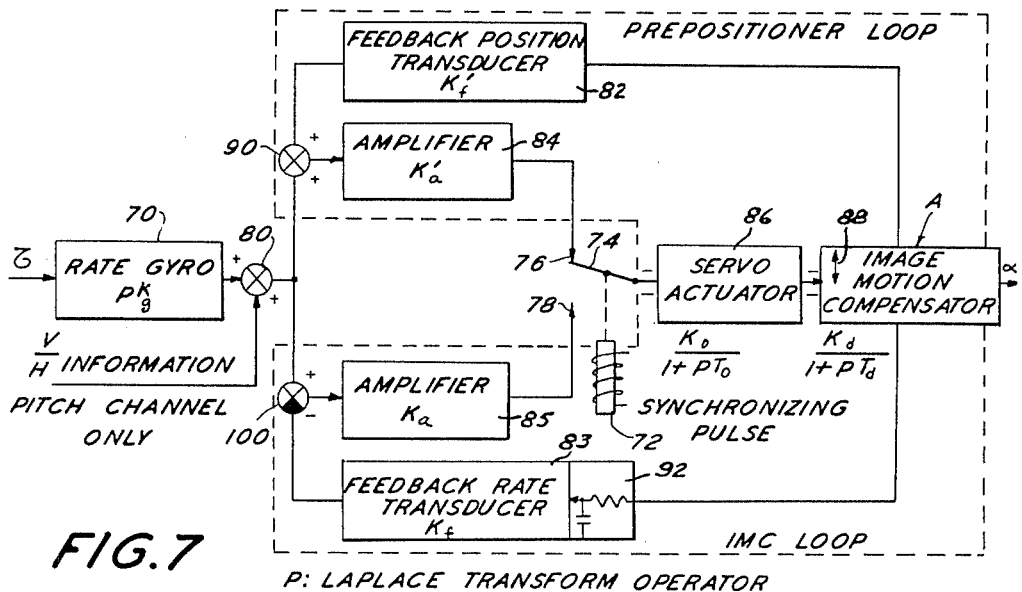

Referring now to the block diagram of FIGURE 7, a functional schematic of the pitch channel of the sensing and feed back system for the image motion compensator A. The roll channel is identical except that it does not require the introduction of a overriding command signal proportional to the ratio of forward speed to altitude of the reconnaissance vehicle.

The control system employed, as can be seen from inspection of FIGURE 7, incorporates two separate and distinct channels or loops. The upper loop is a prepositioning channel which functions when the camera shutter is closed, whereas the lower loop shown represents the image motion compensation channel and only functions when the camera shutter is open. The reason for the prepositioner loop is apparent from an inspection of FIGURE 9. That is, by plotting the curves of Equation IX (FIGURE 9), it can be determined that the deviation angle of the prismatic wedge is most uniform for the various ray incident angles when the prism angle $\alpha$ approaches zero. Thus, in order to maintain the prism angle as close to zero as possible during the shutter opening, it is desirable that the prism angle vary during the exposure in a symmetrical manner about the neutral or parallel face prism condition. Therefore, the function of the prepositioner loop is to maintain the prism wedge in such a manner that its overall change of angle during the time of operation of the image motion compensation loop (IMC Loop) will be symmetrical with respect to the neutral position.

Accordingly, when the camera shutter first begins to open, the IMC Loop is actuated by a synchronizing pulse 72 which switches relay contactor 74 from prepositioner position 76 to IMC position 78 whereby the rate of change of the prism angle is made a direct function of the rate of camera tilt. Therefore, the total angle swept by the prism will be the time integral of the prism angular speed.

The duration of the sync pulse is made constant and equal to the longest expected shutter opening time which is typically 1/100 of a second. Since this time interval is very short compared to the time constant of most reconnaissance vehicles, it can be assumed that the camera rate of tilt or angular speed is constant during the Sync-ON time. Hence, the overall prism angular change during this period can be assumed to be the camera angular speed (if assumed constant) times 1/100 of a second.

During the shutter close time, the sync pulse is OFF, and the prism angle is controlled by the rate gyro 70 through the prepositioner loop. The criteria to be followed by the prepositioner loop in order to determine the value of the prism angle at every instant may be expressed by the following equation:

$$\alpha(t) = -\frac{1}{2}\frac{T_s}{100}\dot{\alpha}(t) \qquad (X)$$

That is, the value of the prism angle, $\alpha$, as a function of time is equal to $-\frac{1}{2}$ (symmetrical displacement about zero prism angle) of the speed of the angular change in the prism angle at the particular time ($T_s$) times the shutter speed (1/100 of a second).

During the Sync-ON time, the IMC Loop will change the prism angle as follows:

$$\alpha(t_0 + T_s) = \alpha(t_0) + \frac{T_s}{100}\dot{\alpha}(t_0) \qquad (XI)$$

where $t_0$ = time at which sync pulse switches to ON.

Therefore, by substituting the value of $\alpha(t_0)$ from (X)

$$\alpha(t_0 \times T_s) = +\frac{1}{2}\frac{T_s}{100}\dot{\alpha}(t_0) \qquad (XII)$$

it is apparent that the deflection of $\alpha$ during the Sync-ON time $T_s$ has occurred between plus and minus $$\frac{1}{2}\frac{T_0}{100}\dot{\alpha}(t_0)$$

and thus, has been symmetrical with respect to the neutral prism angle ($\alpha=0$).

Returning back to FIGURE 7, the vehicular angular displacement $\tau$ is sensed by the rate gyro 70 which delivers an electrical impulse to the summation point 80, which, in the pitch channel, is electrically added the velocity-altitude (v./h.) intelligence of the aircraft. The mathematical function representation of the rate gyro is $pK_g$ where $p$ is the Laplace transfer operator. The signal sum from summation point 80 is delivered to summation point 90 in the prepositioner channel or summation point 100 in the IMC Loop which ever is operative at the particular moment, i.e., shutter closed or open. The summation point 90 electrically adds the intelligence from summation point 80 and the electrical position feedback from position transducer 82 whose information is derived from the angular position of the image motion compensator A at all times. With the prepositioner loop operative (contactor 74 abutting contactor 76) a servo amplifier 84, such as a Minneapolis-Honeywell low-voltage transistor servo amplifier XRJ301 as is shown in bulletin No. 95–2904 dated April 10, 1957, amplifies the resultant signal for transmission to an electro-hydraulic servo valve 86. A similar servo amplifier 85 performs an identical function in the IMC Loop, the latter having a mathematical constant $K_a$. The servo valve 86 is an electro-hydraulic servomotor, such as model No. VJ303, shown in the Minneapolis-Honeywell Regulator Company Bulletin 95–2906, dated April 6, 1959. The output of the servo valve 86 hydraulically drives a piston 88 in actuating cylinder C, the piston being mechanically linked to the pitch lever ring 52 which controls the angular position of the fluid wedge A. As has been set forth hereinbefore, the feedback position transducer 82, which may for example be a carbon film rectilinear potentiometer such as a model III precision potentiometer made by Computer Instruments Corporation of Hempstead, Long Island, New York, measures the angular deviation of the fluid prism A and electrically conveys this position back to the summation point 90. With the IMC Loop operative, the very same feedback transducer 82 transmits its intelligence to a differentiator 92 whereby the rate of change of the angular position $\alpha$ is fedback through the summation point 100 to the servo amplifier 85.

The block diagram of FIGURE 7 gives the transfer function of the various system components, it being pointed out that the time constants of all the several components with the exception of the servo valve 86 and the image motion compensator A, have been assumed to be zero and representing only gain, differentiating or integrating elements.

Still another use for the image motion compensator described above is in high speed astronautical tracking devices which require a continuous monitoring of fixed references such as stars in order to determine position of the vehicle at any instant. Since the image motion compensator A is a hydro-mechanical device which deviates a beam of light or electro magnetic energy by changing the shape of the optical elements, its frequency, response and efficiency of operation is much superior to a device which would be required to drive the mass of a stabilized platform support for a telescope.

Figure 8:
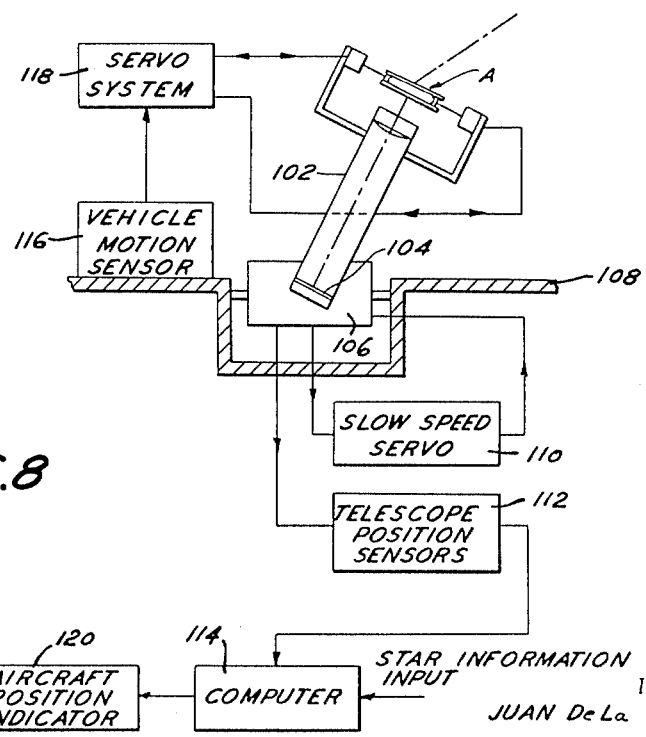
FIGURE 8 is a block diagram illustrating the sensing and actuating system for controlling the image motion compensator.

Referring to FIGURE 8, there is shown schematically an astronautical navigator comprising a telescope 102 having a photoelectric star follower 104 mounted in a conventional manner upon a slow telescope drive and platform assembly 106 in the airframe 108. A slow speed servo motor 110 enables the telescope 102 to follow the star through its sidereal motion. Telescope angular position sensors 112 determine the angular coordinates of the star-locked telescope and feed this information into a computer 114 which is already programmed by the particular star position data.

As in the aerial camera application, the motion compensator A is mounted in front of the telescope so that the fluid deviating elements 12 and 14 will deflect the light beam in response to the various pitch, roll and yaw motions of the vehicle. These irregular angular motions are monitored by a vehicle motion sensor 116 (rate gyro) which cause the servo system 118 to properly actuate the position of the prismatic wedge A and effect compensation. Thus, the aircraft position indicator 120 will yield correct position at all times.

It is to be noted that a gas can be substituted for the liquid element 18 in certain application. Since pressure and temperature affects the dielectric constant of certain gases and liquids, these properties can be used to control the characteristics of the deviating element. It is also apparent that the plane-parallel surfaces of the disks 12 and 14 could also be polished so as to present non-flat configurations, such as spherical or aspherical surfaces and thereby produce a compound lens deviating element with combined deflecting and focusing properties.

Although this invention has been described in considerable detail, such description is intended as being illustrative rather than limiting since the invention may be variously embodied, and the scope of the invention is to be determined as claimed.

What is claimed is:

1. An image stabilizing device for an optical system subject to random angular movement comprising a pair of spaced transparent plates disposed transverse to the axis of collimation of the system, a seal peripherally supported about said plates, a transparent liquid medium interposed between said plates and encapsulated by said seal so as to fill the space therebetween, pivotal means peripherally coupling said plates with respect to each other along one diametrical axis, second pivotal means coupling said plates with respect to each other along a second diametrical axis disposed perpendicular to the first mentioned diametrical axis, and means responsive to the angular movement of the optical system actuating said first and second pivotal means and varying the angular disposition of said plates with respect to one another whereby the prismatic shape of the liquid medium may be altered and the arris thereof oriented in azimuth to deviate a ray of light transmitted therethrough compensatory to the resultant angular movement.

2. An image stabilizing device for an independent optical system focused upon a remote object and subject to angular movement with respect to said object comprising spaced, optically-transparent disks interposed transverse to the axis of collimation of the system, a fluid medium filling the space intermediate the disks and being encapsulated therebetween, means constituting a point for supporting and relatively tilting said disks with respect to each other in any azimuth about the axis of collimation, sensing means responsive to motion of the optical system and measuring the degree and azimuth of the angular movement thereof, and compensation means responsive to said sensing means actuating the orientation of said joint so as to vary the prismatic shape and the azimuth of its arris in correction of the angular deviation in light path resulting from the angular movement of the optical system with respect to the object.

3. An image motion compensating device for an independent optical system subject to angular movement with respect to an object on which it is sighting comprising an optically-transparent fluid element having opposed light transmitting surfaces, transparent disks encapsulating said fluid element transverse to the axis of collimation of said optical system, means constituting a joint for supporting and relatively tilting said disks with respect to each other along 0°–180° and 90°–270° azimuthal axes about the axis of collimation, sensing means measuring the degree and azimuth of the optical system's angular motion with respect to said object, and compensating means responsive to said sensing means continuously orienting said joint whereby the opposed surfaces of said fluid element will be inclined with respect to each other and the arris thereof oriented in azimuth so as to correct for the deviational error in light path caused by the resultant angular motion.

4. An image stabilizing device for an optical system subject to motion with respect to a fixed reference comprising spaced transparent disks disposed transverse to the axis of collimation of the system, a transparent liquid medium encapsulated intermediate said plates so as to fill the space therebetween, supporting means constituting a joint for relatively tilting said plates with respect to each other along 0°–180° and 90°–270° azimuthal axes about the axis of collimation, motion responsive means measuring the degree and azimuth of the angular movement of the optical system with respect to said fixed reference, and compensating means actuated by said motion responsive means orienting said joint and thereby varying the angle of inclination of said plates with respect to one another so that the prismatic angle of the fluid medium will deviate a light beam in compensation of said motion.

5. Image motion compensating means for aircraft and space vehicle optical systems comprising a mechanically-variable, hydro-prismatic element interposed transverse to the axis of collimation of the optical system, means to vary the wedge angle of said hydro-prismatic element along an axis parallel to the vehicular line of flight, means to vary the wedge angle of said hydro-prismatic element along an axis transverse to the vehicular line of flight, and means responsive to the motion of the vehicle actuating said respective means for varying the wedge angle so as to angularly deflect in azimuth a ray of light at the focal plane of the optical system compensatory to the degree of angular deviation thereof resulting from such motion.

6. An image motion stabilizer for aircraft and space vehicle optical systems comprising spaced transparent disks disposed transverse to the axis of collimation of the optical system, a flexible seal peripherally supported about said disks, a liquid element filling the space intermediate said disks and encapsulated therebetween, pitch motion compensating means for changing the angle of inclination of said plates along an axis parallel to the vehicular line of flight, roll motion compensating means for changing the angle of inclination of said plates along an axis transverse to the line of flight, and means responsive to the motion of the vehicle actuating the pitch and roll motion compensating means whereby the angle defined by the surfaces of the liquid element will be varied in degree and azimuth so as to displace the image at the focal plane of the optical system compensatory to that caused by the vehicular motion.

7. The invention of claim 6 wherein said pitch and roll compensating means comprise corresponding screw drive means coupled to said plates, and gear means coupled to respective said screw drive means.

8. The invention of claim 6 wherein said pitch and roll compensating means comprise pneumatic means coupled to said plates.

9. An image motion stabilizer for an aerial camera comprising a liquid element disposed transverse to the axis of collimation of said camera, peripherally sealed transparent plates encapsulating said liquid element to define opposed surfaces thereon with a variable angle of inclination to each other, means constituting a joint for supporting and tilting said plates with respect to each other along X- and Y-axes, and means responsive to camera motion and coupled with said first mentioned means angularly disposing said plates so that the liquid will deflect the image in azimuth at the focal plane of said camera an amount compensatory to the camera motion.

10. An image motion stabilizer for an aerial camera having a shutter which opens and closes to take successive exposures comprising spaced transparent plates having opposed plane parallel surfaces disposed transverse to the axis of collimation of said camera, a liquid element encapsulated intermediate said plates and filling the space therebetween, means constituting a joint pivotally supporting said plates with respect to each other along X- and Y-axes, prepositioner means coupled with said joint and responsive to vehicular angular motion continuously orienting said liquid element during camera-shutter off time so that said element will assume an angular configuration wherein the change in inclination thereof will pass through a plane-parallel status during camera-shutter open time.

11. The invention of claim 10 wherein synchronizing means coupled with the opening of the camera shutter actuates said responsive means so that the rate of change in angle of inclination of said liquid element will vary with the camera rate of change in angular motion.

12. An image stabilizing device for an optical system subject to random angular movement comprising a pair of spaced transparent plates disposed transverse to the axis of collimation of the system, a flexible seal peripherally supported about said plates, a transparent liquid medium interposed between said plates and encapsulated by said seal so as to fill the space therebetween, means constituting a joint for relatively tilting said plates with respect to each other, sensing means responsive to the angular movement of the system measuring the degree and direction of such movement, and compensating means responsive to the measurement of said sensing means actuating said joint means and angularly disposing said plates with respect to each other whereby said liquid medium is urged into a prismatic configuration whose arris is oriented along the azimuth of angular movement so as to compensate for the angular deviation in light path resulting from the system's angular movement.

13. Image motion compensating means for an optical system subject to random angular movement comprising a pair of adjacently-spaced lenses disposed transversely to the axis of collimation of the optical system, supporting means to relatively tilt said lenses with respect to each other along perpendicularly disposed azimuthal axes, a fluid element encapsulated between said lenses and filling the space therebetween, first compensating means responsive to and measuring angular movement of the system along a 0°–180° azimuthal axis actuating the orientation of said joint means along the corresponding azimuthal axis, second compensating means responsive to and measuring angular movement of the system along a 90°–270° azimuthal axis actuating the orientation of said joint means along the latter azimuthal axis whereby the surfaces of the liquid element will be varied in angular inclination and the prismatic arris of said liquid element will be oriented in azimuth so as to displace the image at the focal plane of the optical system compensatory to that caused by the optical system's resultant angular deviation.

14. An image motion stabilizer for an aerial camera having a shutter which opens and closes to take successive exposures comprising spaced transparent plates disposed transverse to the axis of collimation of said camera, a liquid element encapsulated between said plates and filling the space therebetween, means responsive to camera angular motion during the time that the camera shutter is closed continuously orienting said plates with respect to each other so that said liquid element assumes a prepositioned angular configuration which will pass though a plane-parallel status during the time that the shutter is open, and synchronizing means coupled with the opening of the camera shutter actuating said responsive means whereby instantaneous correction of angular deviation with minimum lag is provided.

15. The invention of claim 14 including v./h. compensation means automatically sensing the vehicular velocity and altitude and continuously orienting the prismatic angle in a plane parallel to the line of flight.

16. An image motion stabilizer for airborne vehicle optical systems comprising a mechanically-variable hydro-prismatic element interposed transverse to the axis of collimation of the optical system, pitch motion compensating means for changing the prismatic angle along an axis parallel to the line of flight, roll motion compensating means for changing the prismatic angle transverse to the line of flight, and means responsive to the motion of the vehicle actuating said pitch and roll motion compensating means whereby said prismatic element will be configured in degree and azimuth so as to displace the image at the focal plane of the optical system compensatory to vehicular angular motion.

17. An image motion compensating device comprising a pair of axially-spaced cells each having a centrally disposed aperture with an internal peripheral groove and an interior flanged shoulder, a flexible toroidal-shaped element having the opposite peripheral edges thereof mounted within the respective cell grooves and the outer wall thereof seated against the respective cell shoulders, transparent disks having peripheral bevelled edges mounted within the respective cells and seated against the inner wall of said toroidal-shaped element, clamping rings in the respective cells abutting the exterior face margins of said respective disks and securing the bevelled edges thereof in sealing engagement with said toroidal element so that the opposed inner faces of said disks are adjacently spaced from each other, a liquid medium encapsulated between said disks and said toroidal element, so that said liquid medium defines a variable-angle hydro-prismatic configuration whose arris may be oriented through a 360° azimuth by selectively inclining said cells with respect to each other whereby a beam of light passing through said liquid medium may be angularly deviated in degree and azimuth.

18. The invention of claim 17 including pairs of push-pull means coupling said cells along a 0°–180° azimuthal axis and along a 90–270° azimuthal axis.

19. The invention of claim 18 wherein said push-pull means comprise actuating members radially spaced from said cells and circumferentially spaced from each other in four equal quadrants, and coil spring arms resiliently supporting said cells within said actuating members.

20. An image stabilizing device for an optical system comprising a pair of adjacently-spaced transparent disks disposed transverse to the axis of collimation of the system, a seal peripherally supported about said disks, a transparent liquid medium encapsulated by said seal intermediate said disks and filling the space therebetween, cell housings respectively supporting said disks, a frame annularly spaced about said cell housings, actuating members supported in said frame and disposed at quadrisected intervals about said axis of collimation, resilient arms radially extending in equal quadrants from each of said cell housings with the one pair of arms in each quadrant being coupled to the adjacent actuating member, and means to drive the diametrically opposed actuating members in push-pull relationship with each other so that the liquid medium will be urged into a prismatic configuration with the opposed surfaces thereof being angularly inclined with respect to each other along an imaginary pivotal axis perpendicular to and passing through the said axis of collimation.

References Cited by the Examiner

UNITED STATES PATENTS

| | | | |
|---|---|---|---|
| 2,490,628 | 12/49 | Isserstedt | 95—12.5 X |
| 2,507,459 | 5/50 | Sandvik | 95—12.5 |
| 3,012,463 | 12/61 | Krivit | 88—1 |

JOHN M. HORAN, *Primary Examiner.*

NORTON ANSHER, *Examiner.*